(12) United States Patent
Kumar et al.

(10) Patent No.: US 11,498,586 B2
(45) Date of Patent: Nov. 15, 2022

(54) METHOD AND SYSTEM FOR DYNAMICALLY GENERATING A SECURE NAVIGATION PATH FOR NAVIGATION OF AUTONOMOUS VEHICLE

(71) Applicant: Wipro Limited, Bangalore (IN)

(72) Inventors: Balaji Sunil Kumar, Bengaluru (IN); Manas Sarkar, Barasat (IN)

(73) Assignee: Wipro Limited, Bangalore (IN)

( * ) Notice: Subject to any disclaimer, the term of this patent is extended or adjusted under 35 U.S.C. 154(b) by 60 days.

(21) Appl. No.: 16/929,155

(22) Filed: Jul. 15, 2020

(65) Prior Publication Data
US 2021/0300426 A1  Sep. 30, 2021

(30) Foreign Application Priority Data
Mar. 27, 2020 (IN) .............................. 202041013447

(51) Int. Cl.
*B60W 60/00* (2020.01)
*G01C 21/34* (2006.01)
(Continued)

(52) U.S. Cl.
CPC ...... *B60W 60/0025* (2020.02); *B60W 40/072* (2013.01); *B60W 40/076* (2013.01);
(Continued)

(58) Field of Classification Search
CPC .......... B60W 60/0025; B60W 40/072; B60W 40/076; B60W 40/105; B60W 2520/06;
(Continued)

(56) References Cited

U.S. PATENT DOCUMENTS 6,984,949 B2 * 1/2006 Sarraillon ........... B60L 15/2009
                                                   318/432
9,731,762 B2 * 8/2017 Hass ...................... B60W 30/09
(Continued)

FOREIGN PATENT DOCUMENTS

CN          107167155 A       9/2017
WO     WO-2010081836 A1 *    7/2010  ......... G01C 21/3469

*Primary Examiner* — Aaron L Troost
*Assistant Examiner* — Connor L Knight
(74) *Attorney, Agent, or Firm* — Finnegan, Henderson, Farabow, Garrett & Dunner, LLP (57) ABSTRACT

Disclosed herein is a method and system for dynamically generating a secure navigation path for navigation of an autonomous vehicle. The method comprises detecting disproportional acceleration of the autonomous vehicle when the autonomous vehicle is navigating from a source point to a destination point based on a predefined trajectory plan. The method comprises determining direction values of the autonomous vehicle for reaching a secure path point in the predefined trajectory plan. Based on the determined direction values, distance values are determined. The method includes detecting position of the secure path point for navigation of the autonomous vehicle based on the determined direction values and the distance values. The present disclosure uses secure path point to realign the autonomous vehicle in the predefined trajectory plan to overcome the disproportional acceleration of the autonomous vehicle due to narrow roads, upward slope, or downward slope.

11 Claims, 7 Drawing Sheets

(51) Int. Cl.
*B60W 40/105* (2012.01)
*B60W 40/072* (2012.01)
*B60W 40/076* (2012.01)

(52) U.S. Cl.
CPC ....... *B60W 40/105* (2013.01); *G01C 21/3407* (2013.01); *B60W 2520/06* (2013.01); *B60W 2520/105* (2013.01); *B60W 2552/15* (2020.02); *B60W 2552/25* (2020.02); *B60W 2554/80* (2020.02)

(58) Field of Classification Search
CPC ....... B60W 2520/105; B60W 2552/15; B60W 2552/25; B60W 2554/80; B60W 60/0011; B60W 2520/00; G01C 21/3407
See application file for complete search history.

(56) References Cited

U.S. PATENT DOCUMENTS

| | | | |
|---|---|---|---|
| 9,896,082 B2* | 2/2018 | Inoue | B60W 30/045 |
| 2017/0160745 A1* | 6/2017 | Lauffer | G08G 1/096791 |
| 2017/0277192 A1* | 9/2017 | Gupta | B60W 30/20 |
| 2019/0212749 A1* | 7/2019 | Chen | B60W 30/18154 |
| 2019/0299984 A1* | 10/2019 | Shalev-Shwartz | B60T 7/18 |
| 2019/0384301 A1* | 12/2019 | Greenfield | G01C 21/26 |

* cited by examiner

METHOD AND SYSTEM FOR DYNAMICALLY GENERATING A SECURE NAVIGATION PATH FOR NAVIGATION OF AUTONOMOUS VEHICLE

TECHNICAL FIELD

The present subject matter is generally related to autonomous vehicle and more particularly, but not exclusively, to method and system for dynamically generating a secure navigation path for navigation of an autonomous vehicle.

BACKGROUND

Nowadays, navigating Autonomous Vehicle (AV)/driverless vehicle is becoming an important requirement in different application areas. AVs are the vehicles that are capable of sensing environment around them for navigation without any human intervention. An AV senses the environment with the help of sensors, such as Laser and Light Detection and Ranging (LIDAR), configured in the AV. The AVs may also use Global Positioning System (GPS), computer vision systems, and the like for the navigation purpose.

Generally, AVs make use of a predefined trajectory plan for navigating from a source point to a destination point. The AVs may face problems such as upward ramp or a downward ramp in a road pattern while navigating in the predefined trajectory plan. The upward ramp or the downward ramp in the road pattern may be common in a bridge ramp, roads in hilly terrain, a lane merging to a highway, multi-layer parking ramp and the like. These problems may get complicated when slope of the road is narrow or curvy. Other navigational problems may also include obstacle avoidance. In such situations, the AVs aligns with the road in an inappropriate manner Hence it is challenging for the AVs to adjust the AVs direction.

Further, the existing methods have limitations in providing guidance to the AVs while performing lane changes, lane splits, turns, and/or other vehicle maneuvers.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for dynamically generating a secure navigation path for navigation of an autonomous vehicle. The method comprises detecting, by an autonomous vehicle navigation system, a disproportional acceleration of the autonomous vehicle when the autonomous vehicle is navigating from a source point to a destination point based on a predefined trajectory plan comprising one or more path points. Further, the method comprises identifying, in real-time, one or more parameters associated with the autonomous vehicle when the disproportional acceleration is detected. The one or more parameters comprises speed of the autonomous vehicle, minimum turning radius of the vehicle, curvature of ramp along navigation path of the autonomous vehicle, elevation of ramp along the navigation path of the vehicle, distance of a boundary from the autonomous vehicle, direction of the autonomous vehicle, direction to reach one or more next path points in the trajectory plan, height of the autonomous vehicle and weight of the autonomous vehicle. The method further comprises determining a direction value of the autonomous vehicle for reaching a secure path point in the predefined trajectory plan corresponding to the one or more parameters based on a trained first model. The method further comprises determining, a distance value from the autonomous vehicle along the determined direction for reaching the secure path point in the predefined trajectory plan corresponding to the one or more parameters based on a trained second model. Based the determined direction value and the distance value, the method comprises detecting, position of the secure path point for navigation of the autonomous vehicle.

Further, the present disclosure discloses an autonomous vehicle navigation system for dynamically generating a secure navigation path for navigation of an autonomous vehicle. The autonomous vehicle navigation system comprises a processor and a memory. The memory is communicatively coupled to the processor. The memory stores the processor-executable instructions, which, on execution, causes the processor to detect a disproportional acceleration of the autonomous vehicle when the autonomous vehicle is navigating from a source point to a destination point based on a predefined trajectory plan comprising one or more path points. The processor identifies in real-time, one or more parameters associated with the autonomous vehicle when the disproportional acceleration is detected. The one or more parameters comprises speed of the autonomous vehicle, minimum turning radius of the vehicle, curvature of ramp along navigation path of the autonomous vehicle, elevation of ramp along the navigation path of the vehicle, distance of a boundary from the autonomous vehicle, direction of the autonomous vehicle, direction to reach one or more next path points in the trajectory plan, height of the autonomous vehicle and weight of the autonomous vehicle. The processor determines a direction value of the autonomous vehicle for reaching a secure path point in the predefined trajectory plan corresponding to the one or more parameters based on a trained first model. The processor also determines a distance value from the autonomous vehicle along the determined direction for reaching the secure path point in the predefined trajectory plan corresponding to the one or more parameters based on a trained second model. Thereafter, the processor detects position of the secure path point for navigation of the autonomous vehicle based on the determined direction value and the distance value.

Furthermore, the present disclosure comprises a non-transitory computer readable medium including instructions stored thereon that when processed by at least one processor causes the processor for dynamically generating a secure navigation path for navigation of an autonomous vehicle. The instructions cause the processor to detect a disproportional acceleration of the autonomous vehicle when the autonomous vehicle is navigating from a source point to a destination point based on a predefined trajectory plan comprising one or more path points. Furthermore, the instructions cause the processor to identify in real-time one or more parameters associated with the autonomous vehicle when the disproportional acceleration is detected wherein the one or more parameters comprises speed of the autonomous vehicle minimum turning radius of the autonomous vehicle curvature of ramp along navigation path of the autonomous vehicle elevation of ramp along the navigation path of the vehicle distance of boundary from autonomous vehicle direction of autonomous vehicle direction to reach one or more next path points in the trajectory plan height of autonomous vehicle and width of the autonomous vehicle. Thereafter, the instructions cause the processor to determine direction values of the autonomous vehicle for reaching a secure path point in the predefined trajectory plan corresponding to the one or more parameters based on a trained first model. Further, the instructions cause the processor to determine distance values from the autonomous vehicle along the determined direction value for reaching the secure path point in the predefined trajectory plan corresponding to the one or more parameters based on a trained second model. Finally, the instructions cause the processor to detect position of the secure path point for navigation of the autonomous vehicle based on the determined direction value and the distance value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the scope of the disclosure.

The terms "comprises", "comprising", "includes", "including" or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to method and system for dynamically generating a secure navigation path for navigation of an autonomous vehicle. In an embodiment, the autonomous vehicle may be navigating from a source point to a destination point based on a predefined trajectory plan. The predefined trajectory plan includes one or more secure path points for navigating the autonomous vehicle to reach the destination point. As an example, there may be an upward ramp or a downward ramp in the road where the autonomous vehicle is navigating to reach the destination point. Hence, there may be a possibility that the autonomous vehicle is not aligned with the predefined trajectory plan due to uncertainty of the road. In such scenario, the system may detect a disproportional acceleration of the autonomous vehicle while navigating in the upward ramp or the downward ramp. Upon detecting the disproportional acceleration of the autonomous vehicle, the system may identify, in real-time, one or more parameters associated with the autonomous vehicle when the disproportional acceleration is detected. The one or more parameters may comprise speed of the autonomous vehicle, minimum turning radius of the vehicle, curvature of ramp along navigation path of the autonomous vehicle, elevation of ramp along the navigation path of the vehicle, distance of a boundary from the autonomous vehicle, direction of the autonomous vehicle, direction to reach one or more next path points in the trajectory plan, height of the autonomous vehicle and weight of the autonomous vehicle. The one or more parameters may be determined using sensors.

Based on one or more parameters detected in real time, the system may use a first trained model and a second trained model for determining a direction value and a distance value of the autonomous vehicle respectively to reach the secure path point. Based on the determined direction value and the distance value corresponding to the one or more parameters, the system may detect position of the secure path point for navigation of the autonomous vehicle. Once the position of the secure path point is detected, the autonomous vehicle may localize itself in the detected position to navigate through the secure path point to reach the destination point. In this manner, the present disclosure uses one or more parameters in real time to dynamically generate a secure and a better path point for the autonomous vehicle to reach the destination point.

Figure 1:
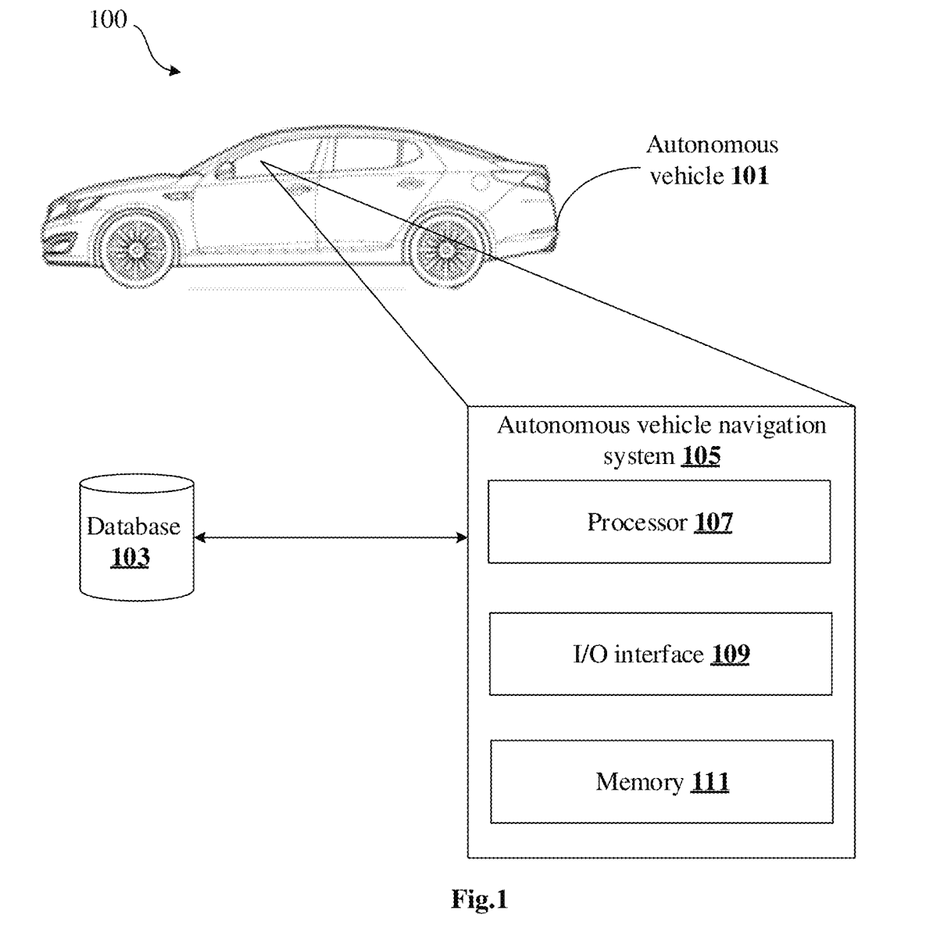
FIG. 1 shows an exemplary architecture for dynamically generating a secure navigation path for navigation of an autonomous vehicle in accordance with some embodiments of the present disclosure.

FIG. 1 shows an exemplary architecture for dynamically generating a secure navigation path for navigation of an autonomous vehicle in accordance with some embodiments of the present disclosure.

The architecture 100 may include an autonomous vehicle 101 [also referred as vehicle 101], an autonomous vehicle navigation system 105 [also referred as system 105], and a database 103. The database 103 may be configured to store secure path point data 203. In some embodiments, the autonomous vehicle navigation system 105 may be configured within the autonomous vehicle 101 as shown in the FIG. 1. In some other embodiments, the autonomous vehicle navigation system 105 may be remotely associated with the autonomous vehicle 101, via a wireless communication network (not shown). As an example, the autonomous vehicle 101 may be a bike, a car, a truck, a bus and the like. The autonomous vehicle 101 may be configured with Lidar sensors to aid in navigating the autonomous vehicle 101 from a source point to a destination point based on a predefined trajectory plan.

The autonomous vehicle navigation system 105 may include a processor 107, an Input/Output (I/O) interface 109 and a memory 111. The I/O interface 109 may be configured to receive the secure path point data 203 from the database 103. The secure path point data 203 provides ideal navigation path points for the autonomous vehicle 101 to reach the destination point. As an example, the autonomous vehicle 101 may be navigating from a source point to a destination point based on a predefined trajectory plan. The predefined trajectory plan includes one or more path points 239 for navigating the autonomous vehicle 101 to reach the destination point. As an example, there may be an upward ramp or a downward ramp in the road where the autonomous vehicle 101 is navigating to reach the destination point. Hence, there may be a possibility that the autonomous vehicle 101 is not aligned with the predefined trajectory plan due to uncertainty of the road. In such scenario, the processor 107 may detect a disproportional acceleration of the autonomous vehicle 101 while navigating in the upward ramp or the downward ramp. The disproportional acceleration may be detected when a torque direction of the autonomous vehicle 101 is opposite to a direction affinity of rotation of wheel of the autonomous vehicle 101. Upon detecting the disproportional acceleration of the autonomous vehicle 101, the autonomous vehicle navigation system 105 may identify, in real-time, one or more parameters associated with the autonomous vehicle 101. The one or more parameters may include speed 253 of the autonomous vehicle 101, minimum turning radius 251 of the autonomous vehicle 101, curvature of ramp 249 along navigation path of the autonomous vehicle 101, elevation of ramp 247 along the navigation path of the autonomous vehicle 101, distance of boundary or a wall 237 along orientation of the vehicle 101 from the autonomous vehicle 101, direction 245 of the autonomous vehicle 101, direction of next path point 243 in the trajectory plan, height 261 of the autonomous vehicle 101, and width 259 of autonomous vehicle 101.

Based on one or more parameters detected in real time, the processor 107 may determine direction values 255 and distance values 263 of the autonomous vehicle 101 to reach the secure path point 233 using a trained first model 241 and a trained second model 257. The first model 241 may be trained by conducting trial run of the autonomous vehicle 101 under varying one or more parameters such as speed 253 of the autonomous vehicle 101, minimum turning radius 251 of the autonomous vehicle 101, curvature of ramp 249 along the navigation path of the autonomous vehicle 101, elevation of ramp 247 along the navigation path of the autonomous vehicle 101, the distance of boundary 237 from the autonomous vehicle 101 along vehicle orientation, the direction 245 of the autonomous vehicle 101, and direction of next path point 243 in the trajectory plan. Similarly, the second model 257 may be trained by conducting trial run of the autonomous vehicle 101 under varying one or more parameters comprising speed 253 of the autonomous vehicle 101, a height 261 of the autonomous vehicle 101, a width 259 of autonomous vehicle 101, the distance of boundary 237 from the autonomous vehicle 101 along vehicle orientation, the direction 245 of the autonomous vehicle 101. Based on the determined direction values 255 and the distance values 263 233 to reach the destination point.

Figure 2A:
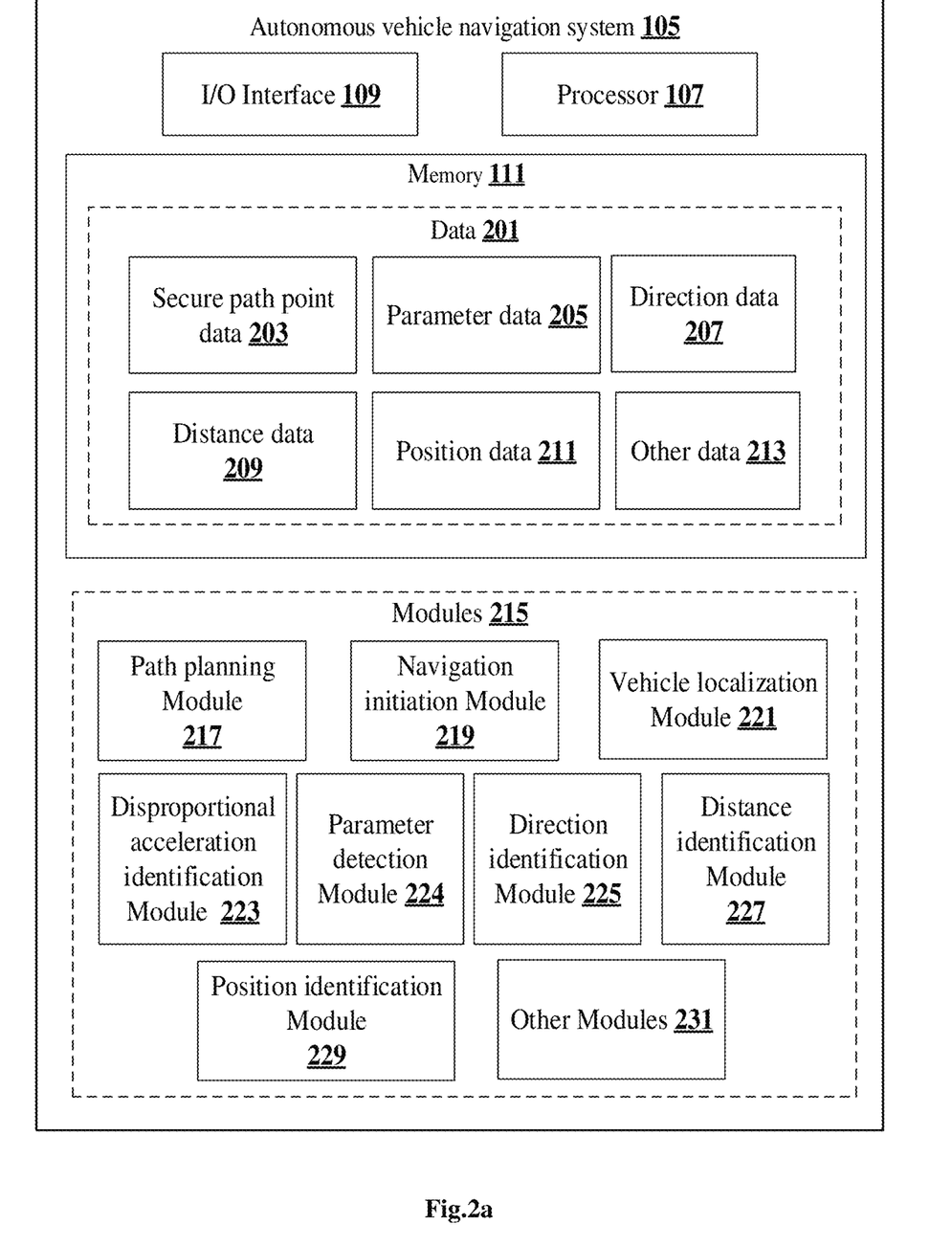
FIG. 2*a* shows block diagram of an autonomous vehicle navigation system in accordance with some embodiments of the present disclosure.

2 of the secure path point 233 for navigation of the autonomous vehicle 101. Once the position of the secure path point 233 is detected, the processor 107 may navigate through the secure path point FIG. 2a shows a block diagram of an autonomous vehicle navigation system 105 in accordance with some embodiments of the present disclosure.

In some implementations, the system 105 may include memory 111 and modules 215. As an example, the 4 memory 111 may be configured in the system 105 as shown in the FIG. 2a. The memory 111 may include data 201. In one embodiment, the data 201 may include, secure path point data 203, parameter data 205, direction data 207, distance data 209, position data 211, and other data 213. In the illustrated FIG. 2a, modules 215 are described here in detail.

In some embodiments, the memory 111 may be in form of various data structures. Additionally, the memory 111 can be organized using data models, such as relational or hierarchical data models. The other data 213 may store data, including temporary data and temporary files, generated by the modules 215 for performing the various functions of the system 105.

In some embodiments, the data 201 stored in the memory 111 may be processed by the modules 215 of the system 105. The modules 215 may be stored within the memory 111. In an example, the modules 215 communicatively coupled to the processor 107 configured in the system 105, may also be present outside the memory 111 as shown in FIG. 2a and implemented as hardware. As used herein, the term modules 215 may refer to an Application Specific Integrated Circuit (ASIC), an electronic circuit, a processor 107 (shared, dedicated, or group) and memory 111 that execute one or more software or firmware programs, a combinational logic circuit, and/or other suitable components that provide the described functionality.

In some embodiments, the modules 215 may include, for example, a path planning module 217, a navigation initiation module 219, a vehicle localization module 221, a disproportional acceleration identification module 223, a parameter detection module 224, a direction identification module 225, a distance identification module 227, a position identification module 229, and other modules 231. The other modules 231 may be used to perform various miscellaneous functionalities of the system 105. It will be appreciated that such aforementioned modules 215 may be represented as a single module or a combination of different modules.

In an embodiment, the other modules 231 may be used to perform various miscellaneous functionalities of the system 105. Furthermore, a person of ordinary skill in the art will appreciate that in an implementation, the one or more modules 215 may be stored in the memory 111, without limiting the scope of the disclosure. The said modules 215 when configured with the functionality defined in the present disclosure will result in a novel hardware.

Figure 2B:
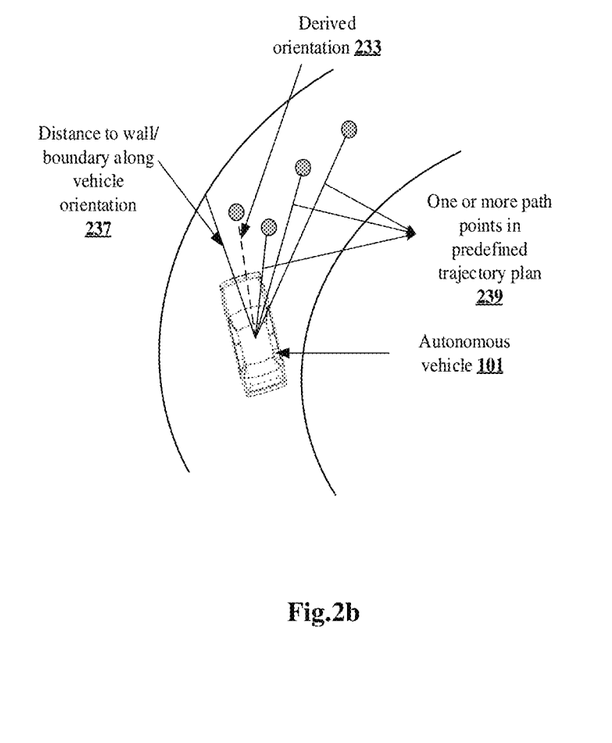
FIG. 2*b* shows an exemplary method for dynamically generating a secure navigation immediate next trajectory point for navigation of an autonomous vehicle accordance with some embodiments of the present disclosure.

In an embodiment, the path planning module 217 may be configured to generate a predefined trajectory plan for the autonomous vehicle 101 to reach from a source point to a destination point. The predefine trajectory plan may include one or more path points 239. As an example, the autonomous vehicle 101 may require the predefined trajectory plan, possibly 10, 20 meters ahead for initiating a navigation process. The navigation initiation module 219 may be configured to initiate the navigation process for autonomously driving of the autonomous vehicle 101 from the source point to the destination point based the predefined trajectory plan. As an example, the autonomous vehicle 101 may be navigating from the source point to the destination point and hence the predefined trajectory plan may be as shown in FIG. 2b. The predefined trajectory plan may include one or more path points 239.

As shown in FIG. 2b the autonomous vehicle 101 may be navigating in the predefined trajectory plan comprising one or more path points 239. As an example, the road may include a ramp, or curves and due to the ramp or curves, the autonomous vehicle 101 may deviate from the predefined trajectory plan due to disproportional acceleration. To avoid such situations, the autonomous vehicle navigation system 105 may identify a derived orientation towards a secure path point 233] to realign the autonomous vehicle 101 in the predefined trajectory plan based on the parameter data 205. Therefore, the autonomous vehicle navigation system 105 may identify the distance values 263 and the direction values 255 from the autonomous vehicle 101 to reach to the secure path point 233. Based on the distance values 263 and the direction values 255 to reach the secure path point 233, the system 105 may identify the position of the secure path point 233. Once the position is detected, the system 105 may localize the vehicle 101 in the detected position and follow the secure path point 233 to reach the destination point. In an embodiment, the identified secure path point 233 is stored as the secure path point data 203.

The vehicle localization module 221 may be configured to identify current position of the autonomous vehicle 101 on a classified vector map. As an example, the vehicle localization module 221 may use a camera-based location identifier to observe unique landmarks and road structure.

In an embodiment, the disproportional acceleration identification module 223 may be configured to detect a disproportional acceleration of the autonomous vehicle 101 when the autonomous vehicle 101 is navigating from the source point to the destination point based on the predefined trajectory plan. As an example, the disproportional acceleration identification module 223 may detect a back slip of the autonomous vehicle 101 due to an upward slope or a downward slope. The back slip of the autonomous vehicle 101 may occur when a torque direction is opposite to a direction of rotation of wheel. Similarly, when the autonomous vehicle 101 is on the downward slope, a forward speed is disproportional to the autonomous vehicle acceleration. In an embodiment, the disproportional acceleration may be detected by identifying a speed gap, when the vehicle 101 is navigating in the predefined trajectory plan. The speed gap may be identified by comparing proposed velocity of the vehicle 101 based on the predefined trajectory plan with current velocity of the vehicle 101. Based on the speed gap the autonomous vehicle navigation system 105 may either apply one of a break or a torque to the vehicle 101. The autonomous vehicle navigation system 105 identifies the direction of rotation of wheel of the autonomous vehicle 101 using a rotation measuring sensor. If the direction of rotation of wheel is disproportional to the applied direction of the torque, then the disproportional acceleration is detected.

In an embodiment, the parameter detection module 224 may be configured to detect the one or more parameters of the vehicle 101 in real-time when the disproportional acceleration is detected by the disproportional acceleration identification module 223. The one or more parameters may include, but not limited to, speed 253 of the autonomous vehicle 101, minimum turning radius 251 of the autonomous vehicle 101, curvature of ramp 249 along navigation path of the autonomous vehicle 101, elevation of ramp 247 along the navigation path of the autonomous vehicle 101, distance of boundary 237 from the autonomous vehicle 101 along vehicle orientation, the direction 245 of the autonomous vehicle 101, the direction of next path point 243 in the trajectory plan, the height 261 of the autonomous vehicle 101, and the width 259 of autonomous vehicle 101 is stored as the parameter data 205 in the memory 111. The one or more parameters of the vehicle may be stored as parameter data 205.

In an embodiment, the direction identification module 225 may be configured to determine the direction values 255 of the autonomous vehicle 101 for reaching the secure path point 233 in the predefined trajectory plan corresponding to the one or more parameters. The direction values 255 may be determined based on a trained first model 241. The direction values 255 may be stored as direction data 207.

Figure 2C:
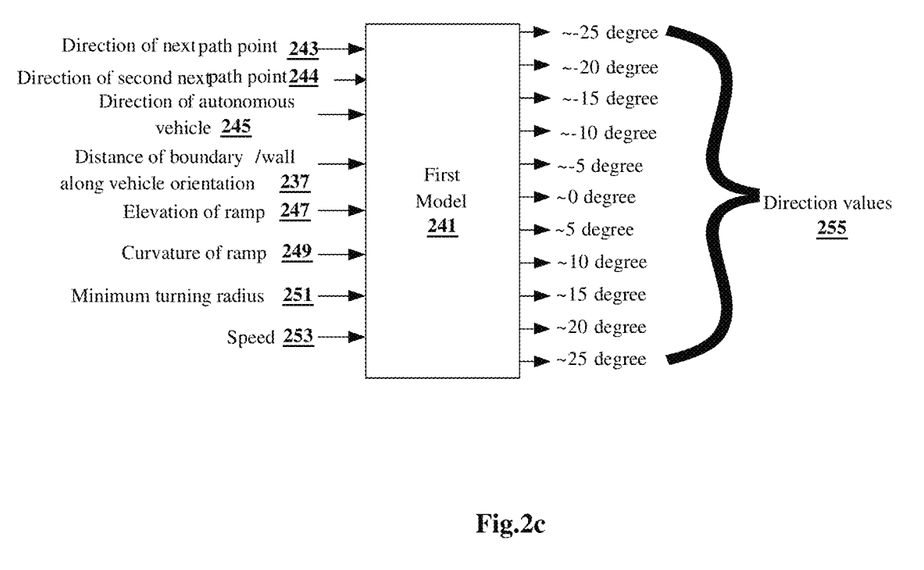
FIG. 2*c* shows block diagram of a first model to be trained to determine a direction value of the secure path point in accordance with some embodiments of the present disclosure.

As shown in FIG. 2c, the first model 241 is a first machine learning model. The first machine learning model is trained by conducting trial run of the autonomous vehicle 101 under varying one or more parameters. The first machine learning model may provide the direction values 255 in terms of degrees for secure path point 233 under varying conditions of the vehicle 101. The first model 241 may be trained by conducting trial run of the autonomous vehicle 101 under varying one or more parameters such as speed 253 of the autonomous vehicle 101, minimum turning radius 251 of the autonomous vehicle 101, curvature of ramp 249 along navigation path of the autonomous vehicle 101, elevation of ramp 247 along the navigation path of the vehicle 101, the distance of boundary 237 from the autonomous vehicle 101 along vehicle orientation, the direction 245 of the autonomous vehicle 101 the direction of next path point 243 and the direction of the second next path point 244 as shown in FIG. 2c.

Figure 2D:
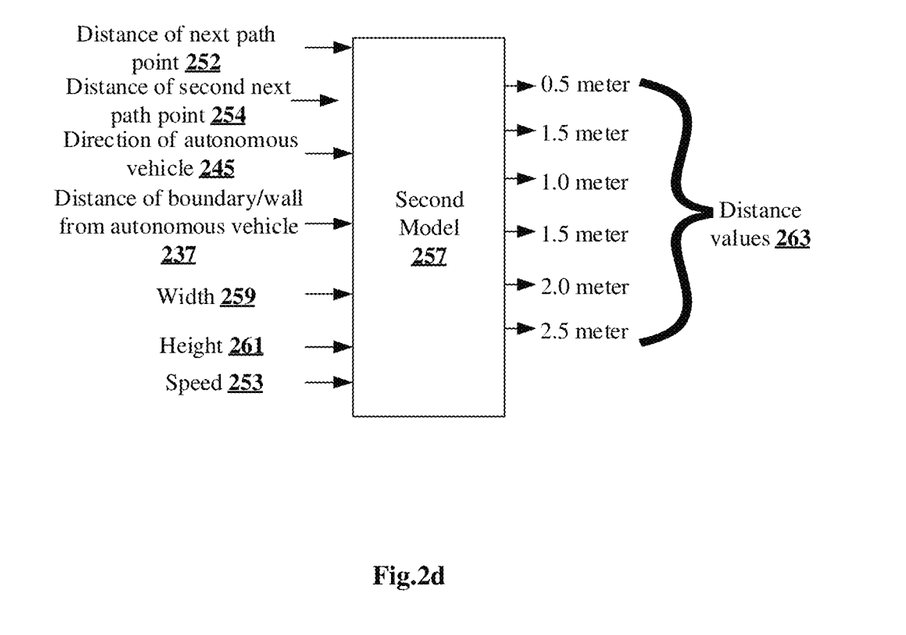
FIG. 2*d* shows block diagram of a second model to be trained to determine a distance value of the secure path point in accordance with some embodiments of the present disclosure.

As shown in FIG. 2d, in an embodiment, the distance identification module 227 may be configured to determine distance values 263 from the autonomous vehicle 101 along the determined direction values 255 for reaching a secure path point 233. The distance values 263 may be determined based on a trained second model 257. The distance values 263 may be stored in the memory 111 as distance data 209. The second model 257 may be trained by conducting trial run of the autonomous vehicle 101 under varying one or more parameters such as speed 253 of the autonomous vehicle 101, the distance of boundary 237 from the autonomous vehicle 101 along vehicle orientation, the direction 245 of the autonomous vehicle 101, the distance of next path point 252, the distance of second next path point 254, the height 261 of the autonomous vehicle 101 and the width 259 of the autonomous vehicle 101 as shown in FIG. 2d. The trained second model 257 may provide the distance values 263 in terms of meters as shown in FIG. 2d.

Figure 2E:
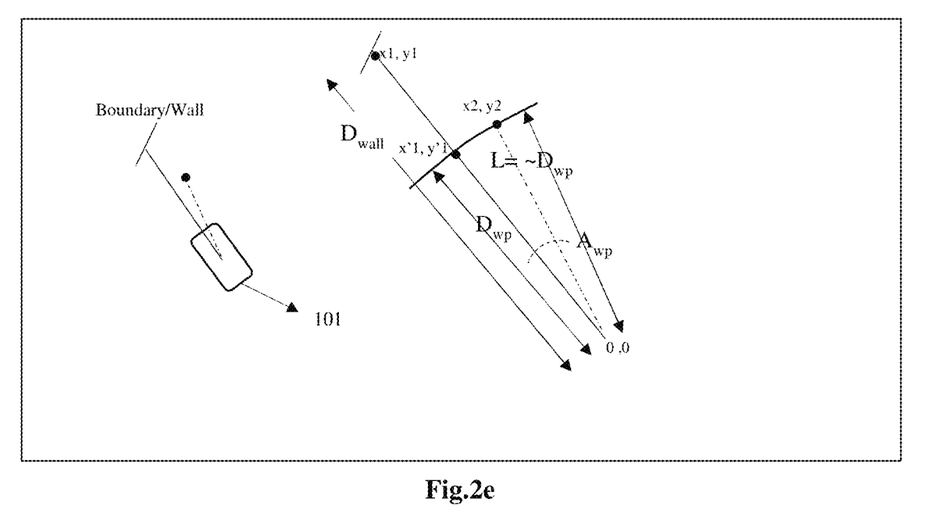
FIG. 2*e* illustrates the method for detecting the position of the secure path point in accordance with some embodiments of the present disclosure.

In an embodiment, the position identification module 229 may be configured to detect the position of the secure path point 233 for navigation of the autonomous vehicle 101 based on the determined direction values 255 and the distance values 263. The position of the secure path point 233 is stored in the memory 111 as position data 211. FIG. 2e illustrates the method for detecting the position of the secure path point 233. As an example, Dwp may be the distance to reach secure path point 233 and ($A_{wp}$) may be the direction to reach the secure path point 233. In an embodiment, (x1, y1) is the coordinate of the road boundary, that the vehicle 101 is looking. If the road boundary is at distance Dwall, then: x1=0+Dwall and y1=0. In an embodiment, (x'1, y'1) is the position towards the vehicle orientation direction i.e. towards wall/boundary at distance $D_{wp}$. (x'1, y' 1) may be on the same arc of radius $D_{wp}$ centering vehicle position (0,0) then, x'1=0+$D_{wp}$ and y'1=0.

In an embodiment, the secure path point 233 at (x2, y2) is determined with respect to vehicle 101 position (0, 0). Approximating (0,0), (x'1, y'1) and (x2, y2) forming a right-angle triangle, where angle at (x'1, y'1) forms 90 degree, the following equations may be provided as below.

$L*\sin(A_{wp}) = y2 - y'1$, where '$L$' is $\sim D_{wp}$ but bigger than $D_{wp}$     Equation 1

Wherein: y2=y'1+$D_{wp}*\sin$ ($A^{wp}$)

By substituting value of y2 in below equation of circle, $(x)^2+(y)^2=(D_{wp})^2$ as both (x'1,y'1)&(x2,y2) fall on arc of radius $D_{wp}$     Equation 2 the value of x may be obtained as x2.

Figure 3:
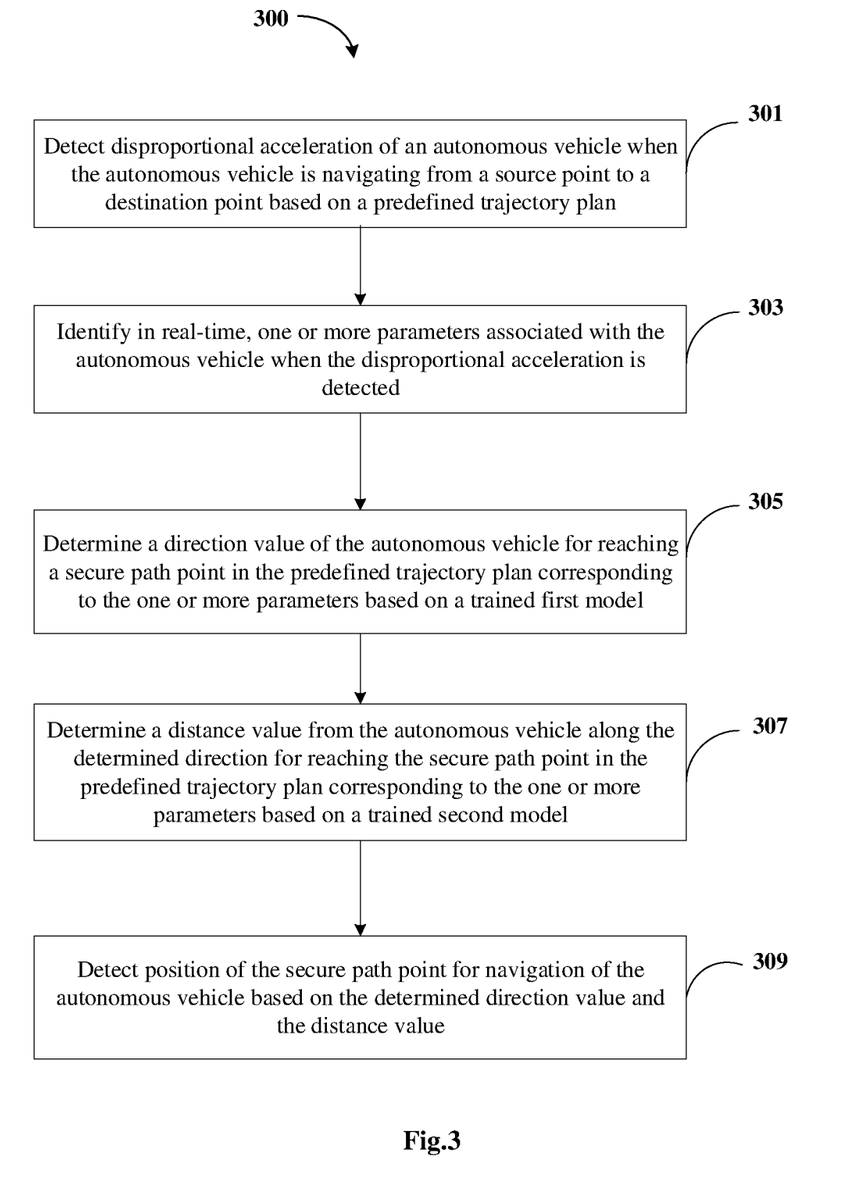
FIG. 3 shows a flowchart illustrating method for dynamically generating the secure navigation path for navigation of the autonomous vehicle in accordance with some embodiments of the present disclosure.

FIG. 3 shows a flowchart illustrating method for dynamically generating the secure navigation path for navigation of the autonomous vehicle in accordance with some embodiments of the present disclosure.

As illustrated in FIG. 3, the method 300 includes one or more blocks illustrating a method of 1. The method 300 may be described in the general context of computer executable instructions. Generally, computer executable instructions can include routines, programs, objects, components, data structures, procedures, modules, and functions, which perform specific functions or implement specific abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, the method 300 may include detecting disproportional acceleration of the autonomous vehicle 101 when the autonomous vehicle 101 is navigating from the source point to the destination point based on the predefined trajectory plan. The predefined trajectory plan may include one or more path points 239. As an example, the disproportional acceleration identification module 223 may detect the disproportional acceleration the autonomous vehicle 101 by identifying a speed gap, when the vehicle 101 is navigating in the predefined trajectory plan. The speed gap may be identified by comparing proposed velocity of the vehicle 101 based on the predefined trajectory plan with current velocity of the vehicle 101. Based on the speed gap the autonomous vehicle navigation system 105 may either apply one of break or a torque to the vehicle 101. The autonomous vehicle navigation system 105 identifies the direction of rotation of wheel of the autonomous vehicle 101 using a rotation measuring sensor. If the direction of rotation of the wheel is disproportional to the applied direction of the torque, then the disproportional acceleration is detected.

At block 303, the method 300 may include identifying in real-time, one or more parameters associated with the autonomous vehicle 101 when the disproportional acceleration is detected. The one or more parameters may include speed 253 of the autonomous vehicle 101, minimum turning radius 251 of the autonomous vehicle 101, curvature of ramp 249 along navigation path of the autonomous vehicle 101, elevation of ramp 247 along the navigation path of the autonomous vehicle 101, the distance of a boundary 237 from the autonomous vehicle 101 along vehicle orientation wherein the boundary may include walls as well, the direction 245 of the autonomous vehicle 101, the direction of next path point 243, direction of second next path point 244, the height 261 of the autonomous vehicle 101 and the width 259 of the autonomous vehicle 101.

At block 305, the method 300 may include determining the direction values 255 of the autonomous vehicle 101 for reaching the secure path point 233 in the predefined trajectory plan corresponding to the one or more parameters based on a trained first model 241. The first model 241 may be trained by conducting trial run of the autonomous vehicle 101 under varying one or more parameters comprising the speed 253 of the autonomous vehicle 101, the minimum turning radius 251 of the autonomous vehicle 101, the curvature of ramp 249 along the navigation path of the autonomous vehicle 101, the elevation of ramp 247 along the navigation path of the autonomous vehicle 101, the distance of boundary 237 from the autonomous vehicle 101 along vehicle orientation, the direction 245 of the autonomous vehicle 101, the direction of next path point 243 and direction of second next path point 244.

At block 307, the method 300 may include determining the distance values 263 from the autonomous vehicle 101 along the determined direction values 255 for reaching the secure path point 233 in the predefined trajectory plan corresponding to the one or more parameters based on a trained second model 257. The second model 257 may be trained by conducting trial run of the autonomous vehicle 101 under varying one or more parameters comprising the speed 253 of the autonomous vehicle 101, the height 261 of the autonomous vehicle 101, the width 259 of the autonomous vehicle 101, the distance of boundary 237 from the autonomous vehicle 101 along vehicle orientation, the direction 245 of the autonomous vehicle 101, the distance of next path point 252 and the distance of second next path point 254 in the trajectory plan.

At block 309, the method 300 may include detecting position of the secure path point 233 for navigation of the autonomous vehicle 101 based on the determined direction values 255 and the distance values 263.

Computer System

Figure 4:
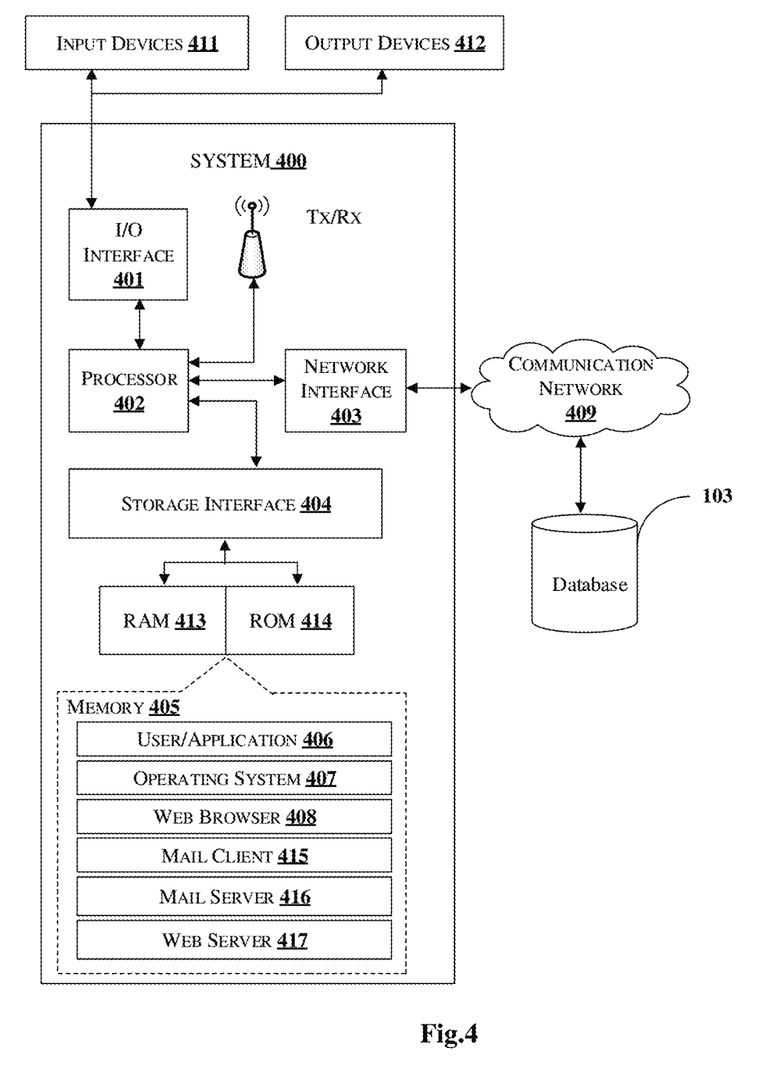
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be autonomous vehicle navigation system 105, which is used for dynamically generating a secure navigation path for navigation of the autonomous vehicle 101. The computer system 400 may include a central processing unit ("CPU" or "processor") 402. The processor 402 may comprise at least one data processor for executing program components for executing user or system-generated business processes. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 401, the computer system 400 may communicate with one or more I/O devices 411 and 412. In some implementations, the I/O interface 401 may be used to connect to a database 103 to receive predefined trajectory plan.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc.

The communication network 409 can be implemented as one of the several types of networks, such as intranet or Local Area Network (LAN) and such within the organization. The communication network 409 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, user/application 406, an operating system 407, a web browser 408, mail client 415, mail server 416, web server 417 and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like. A user interface may facilitate display, execution, interaction, manipulation, or operation of program components through textual or graphical facilities. For example, user interfaces may provide computer interaction interface elements on a display system operatively connected to the computer system 500, such as cursors, icons, check boxes, menus, windows, widgets, etc. Graphical User Interfaces (GUIs) may be employed, including, without limitation, APPLE MACINTOSH® operating systems, IBM™ OS/2, MICROSOFT™ WINDOWS™ (XP™ VISTA™/7/8, 10 etc.), Unix® X-Windows, web interface libraries (e.g., AJAX™, DHTML™, ADOBE® FLASH™, JAVASCRIPT™, JAVA™, etc.), or the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein.

In an embodiment, the present disclosure provides method and system for dynamically generating a secure navigation path for navigation of the autonomous vehicle.

In an embodiment, the present disclosure uses machine learning models which is trained under varying one or more parameters of vehicle for determining a direction value and a distance value for reaching a secure path point in a predefined trajectory plan.

In an embodiment, the present disclosure uses the secure path point to realign the autonomous vehicle in the predefined trajectory plan to overcome the disproportional acceleration of the autonomous vehicle due to narrow roads, upward slope, or downward slope.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise. The enumerated listing of items does not imply that any or all the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
| --- | --- |
| 100 | Architecture |
| 101 | Autonomous vehicle |
| 103 | Database |
| 105 | Autonomous vehicle navigation system |
| 107 | Processor |
| 109 | I/O Interface |
| 111 | Memory |
| 201 | Data |
| 203 | Secure path point data |
| 205 | Parameter data |
| 207 | Direction data |
| 209 | Distance data |
| 211 | Position data |
| 213 | Other data |
| 215 | Modules |
| 217 | Path planning module |
| 219 | Navigation initiation module |
| 221 | Vehicle localization module |
| 223 | Disproportional acceleration identification module |
| 224 | Parameter detection module |
| 225 | Direction identification module |
| 227 | Distance identification module |
| 229 | Position identification module |
| 231 | Other modules |
| 233 | secure path point |
| 237 | Distance to wall/boundary along vehicle orientation |
| 239 | One or more path points in predefined trajectory plan |
| 241 | First model |
| 243 | Direction to reach one or more next path points |
| 245 | Direction of autonomous vehicle |
| 247 | Elevation of ramp |
| 249 | Curvature of ramp |
| 251 | Minimum turning radius |
| 253 | Speed |
| 255 | Direction values |
| 257 | Second model |
| 259 | Width |
| 261 | Height |
| 263 | Distance values |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Mail Client |
| 416 | Mail Server |
| 417 | Web Server |

What is claimed is:

1. A method for dynamically generating a secure navigation path for navigation of an autonomous vehicle, the method comprising:

detecting, by an autonomous vehicle navigation system, a disproportional acceleration of the autonomous vehicle when the autonomous vehicle is navigating from a source point to a destination point based on a predefined trajectory plan comprising one or more path points;

identifying, by the autonomous vehicle navigation system, in real-time, one or more parameters associated with the autonomous vehicle when the disproportional acceleration is detected, wherein the one or more parameters comprises speed of the autonomous vehicle, minimum turning radius of the autonomous vehicle, curvature of ramp along navigation path of the autonomous vehicle, elevation of ramp along the navigation path of the autonomous vehicle, distance of boundary from the autonomous vehicle, direction of the autonomous vehicle, direction to reach one or more next path points in the trajectory plan, height of the autonomous vehicle and width of the autonomous vehicle;

training a plurality of machine learning models by conducting a trial run of the autonomous vehicle using the identified one or more parameters;

determining, by the autonomous vehicle navigation system, direction values of the autonomous vehicle for reaching a secure path point in the predefined trajectory plan based on a trained first model of the plurality of trained machine learning models;

determining, by the autonomous vehicle navigation system, distance values from the autonomous vehicle along the determined direction values for reaching the secure path point in the predefined trajectory plan based on a trained second model of the plurality of trained machine learning models; and detecting, by the autonomous vehicle navigation system, a position of the secure path point for navigation of the autonomous vehicle based on the determined direction values and the distance values.

2. The method as claimed in claim 1, wherein the disproportional acceleration is detected by performing steps comprising:

identifying a speed gap, when the vehicle is navigating in the predefined trajectory plan, by comparing proposed velocity of the vehicle based on the predefined trajectory plan with current velocity of the vehicle;

identifying whether to apply one of a brake or a torque to the vehicle based on the speed gap;

identifying a direction of rotation of a wheel of the autonomous vehicle using a rotation measuring sensor; and detecting the disproportional acceleration of the autonomous vehicle when the direction of rotation of the wheel is opposite to an applied direction of the torque or of the brake.

3. The method as claimed in claim 1, wherein the disproportional acceleration is detected when the autonomous vehicle is navigating in one of an upward slope or a downward slope.

4. The method as claimed in claim 1, wherein training the first model of the plurality of machine learning models comprises conducting the trial run of the autonomous vehicle under varying one or more parameters comprising speed of the autonomous vehicle, minimum turning radius of the autonomous vehicle, curvature of ramp along the navigation path of the autonomous vehicle, elevation of ramp along the navigation path of the autonomous vehicle, distance of boundary from the autonomous vehicle, direction of the autonomous vehicle, and direction to reach one or more next path points in the trajectory plan.

5. The method as claimed in claim 1, wherein training the second model of the plurality of machine learning models comprises conducting the trial run of the autonomous vehicle under varying one or more parameters comprising speed of the autonomous vehicle, height of the autonomous vehicle, width of the autonomous vehicle, distance of boundary from the autonomous vehicle, direction of the autonomous vehicle, and distance to reach one or more next path points in the trajectory plan.

6. An autonomous vehicle navigation system for dynamically generating a secure navigation path for navigation of an autonomous vehicle, the autonomous vehicle navigation system comprising:

a processor; and a memory communicatively coupled to the processor, wherein the memory stores the processor-executable instructions, which, on execution, causes the processor to:

detect disproportional acceleration of the autonomous vehicle when the autonomous vehicle is navigating from a source point to a destination point based on a predefined trajectory plan comprising one or more path points;

identify, in real-time, one or more parameters associated with the autonomous vehicle when the disproportional acceleration is detected, wherein the one or more parameters comprises speed of the autonomous vehicle, minimum turning radius of the vehicle, curvature of ramp along navigation path of the autonomous vehicle, elevation of ramp along the navigation path of the autonomous vehicle, distance of boundary from the autonomous vehicle, direction of the autonomous vehicle, direction to reach one or more next path points in the trajectory plan, height of the autonomous vehicle and width of the autonomous vehicle;

train a plurality of machine learning models by conducting a trial run of the autonomous vehicle using the identified one or more parameters;

determine direction values of the autonomous vehicle for reaching a secure path point in the predefined trajectory plan based on a trained first model of the plurality of trained machine learning models;

determine distance values from the autonomous vehicle along the determined direction value for reaching the secure path point in the predefined trajectory plan based on a trained second model of the plurality of trained machine learning models; and detect a position of the secure path point for navigation of the autonomous vehicle based on the determined direction values and the distance values.

7. The system as claimed in claim 6, wherein the processor detects the disproportional acceleration by performing steps comprising:

identifying a speed gap, when the autonomous vehicle is navigating in the predefined trajectory plan, by comparing a proposed velocity of the autonomous vehicle based on the predefined trajectory plan with a current velocity of the autonomous vehicle;

identifying whether to apply one of a brake or a torque to the autonomous vehicle based on the identified speed gap;

identifying a direction of rotation of a wheel of the autonomous vehicle using a rotation measuring sensor; and detecting the disproportional acceleration of the autonomous vehicle when the direction of rotation of the wheel is opposite to an applied direction of the torque or of the brake.

8. The system as claimed in claim 6, wherein the processor detects the disproportional acceleration when the vehicle is navigating in one of an upward slope or a downward slope.

9. The system as claimed in claim 6, wherein the processor trains the first model of the plurality of machine learning models by conducting the trial run of the autonomous vehicle under varying one or more parameters comprising speed of the autonomous vehicle, minimum turning radius of the autonomous vehicle, curvature of ramp along the navigation path of the autonomous vehicle, elevation of ramp along the navigation path of the autonomous vehicle, distance of boundary from the autonomous vehicle, direction of the autonomous vehicle, and direction to reach one or more next path points in the trajectory plan.

10. The system as claimed in claim 6, wherein the processor trains the second model of the plurality of machine learning models by conducting the trial run of the autonomous vehicle under varying one or more parameters comprising speed of the autonomous vehicle, height of the autonomous vehicle, width of the autonomous vehicle, distance of boundary from the autonomous vehicle, direction of the autonomous vehicle, and distance to reach one or more next path points in the trajectory plan.

11. A non-transitory computer readable medium including instructions stored thereon that when processed by at least one processor causes the processor to:

detect a disproportional acceleration of the autonomous vehicle when the autonomous vehicle is navigating from a source point to a destination point based on a predefined trajectory plan comprising one or more path points;

identify in real-time, one or more parameters associated with the autonomous vehicle when the disproportional acceleration is detected, wherein the one or more parameters comprises speed of the autonomous vehicle, minimum turning radius of the autonomous vehicle, curvature of ramp along navigation path of the autonomous vehicle, elevation of ramp along the navigation path of the autonomous vehicle, distance of boundary from the autonomous vehicle, direction of the autonomous vehicle, direction to reach one or more next path points in the trajectory plan, height of the autonomous vehicle and width of the autonomous vehicle;

train a plurality of machine learning models by conducting a trial run of the autonomous vehicle using the identified one or more parameters;

determine direction values of the autonomous vehicle for reaching a secure path point in the predefined trajectory plan based on a trained first model of the plurality of trained machine learning models;

determine distance values from the autonomous vehicle along the determined direction values for reaching the secure path point in the predefined trajectory plan based on a trained second model of the plurality of trained machine learning models; and     detect a position of the secure path point for navigation of the autonomous vehicle based on the determined direction values and the distance values.

\* \* \* \* \*